Aug. 12, 1958   R. L. GAINES   2,846,806
FISH LURE HOLDER
Filed Sept. 8, 1954
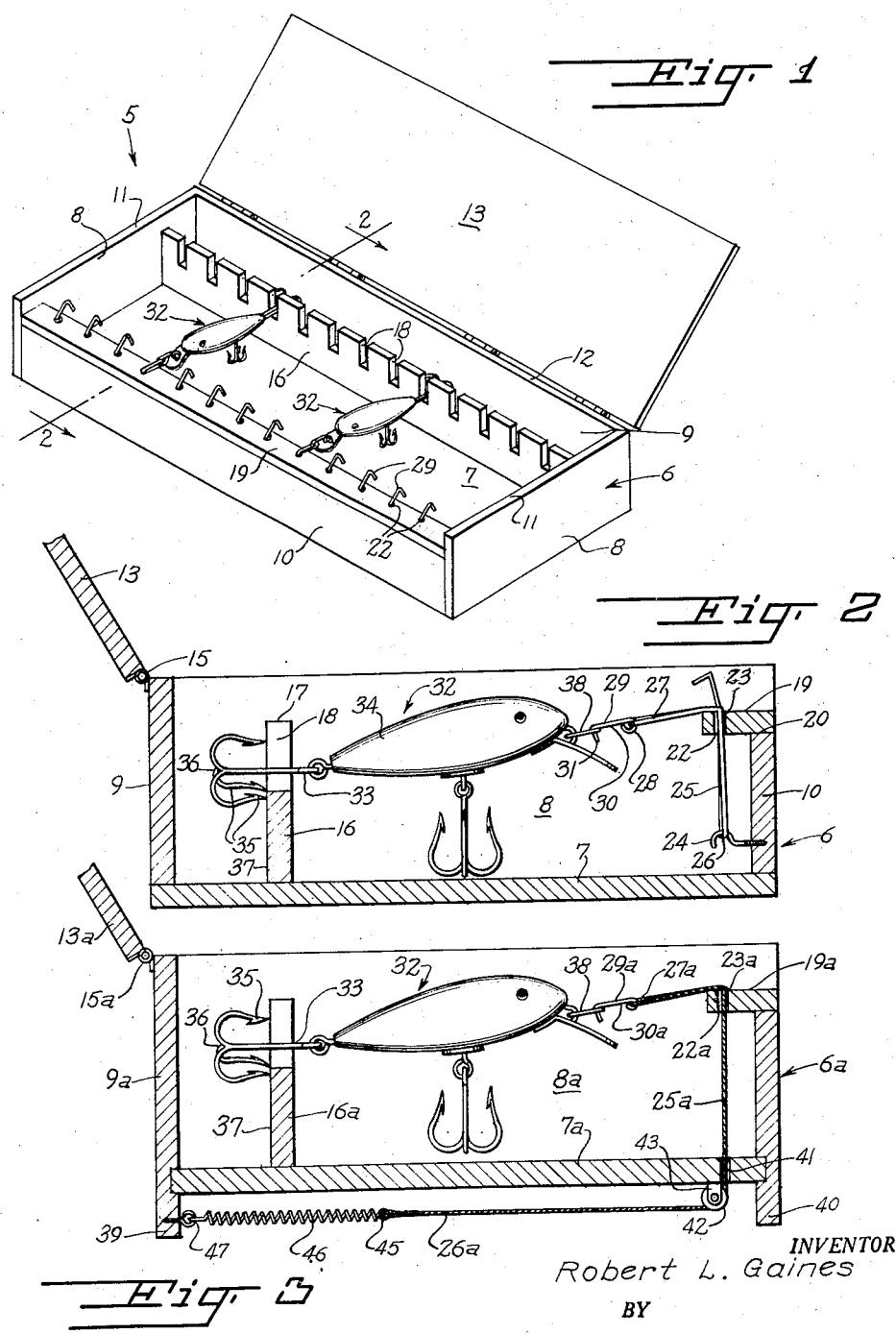
INVENTOR.
Robert L. Gaines
BY
McMorrow, Berman & Davidson
ATTORNEYS

United States Patent Office 2,846,806
Patented Aug. 12, 1958

2,846,806

FISH LURE HOLDER

Robert L. Gaines, Austin, Tex.

Application September 8, 1954, Serial No. 454,803

5 Claims. (Cl. 43—54.5)

This invention relates to an improved holder for fish lures, and among important objects of the invention are to provide a practical, safe, and efficient device of this kind which prevents damage to expensive lures by the hooks of other lures or by their own hooks, by rubbing against trays of tackle boxes, damage to the hands due to free hooks, eliminates tangling of lures when a tackle box or the like is upset or is dropped or is carried in an unusual position and/or tangling of lures with lines, leaders, and other objects in a tackle box or the like, and precludes spilling of lures from a tackle box or the like.

Another important object of the invention is the provision of a device of the character indicated above which can be advantageously used as a safety display device in tackle stores, for use in salesman's kits, and for private display of lures.

Other important objects and advantageous features of the invention will be apparent from the following description and the accompanying drawings, wherein, for purposes of illustration only, specific forms of the invention are set forth in detail.

Figure 1 is a perspective view of a tackle box of the invention with the cover open;

Figure 2 is an enlarged fragmentary transverse vertical section taken on the line 2—2 of Figure 1; and Figure 3 is a view similar to Figure 2, showing a different form of tensioned retaining means.

Referring in detail to the drawings, wherein like numerals designate like parts throughout the several views, and first to Figures 1 and 2 thereof, the numeral 5 generally designates the device therein shown.

The device 5 comprises a suitable longitudinally elongated box-like container 6, made of desired and suitable materials, having a bottom wall 7, similar end walls 8, a high back wall 9, and a low front wall 10, the end walls and side walls rising from the bottom wall 7. The upper edges 11 of the end walls 8 being preferably on a level with the upper edge 12 of the back wall 9.

A cover plate 13, proportioned to abut the upper edges 11 of the end walls 8 and the upper edge 12 of the back wall 9 in the closed position of the cover plate 13, is hinged at one edge to the upper edge 12 of the back wall 9, as indicated at 15.

Spaced forwardly adjacent the back wall 9 and parallel thereto is a vertical longitudinal slotted bar 16 which is fixed to and rises from the bottom wall 7. The bar 16 has an upper edge 17 which is provided with a plurality of preferably equally spaced vertical slots or notches 18 therealong, the slots 18 being narrower than the usual spread or width of lure gang hooks, and sufficiently spaced from each other to preclude contact between adjacent lures when in place in the container 6.

An apertured bar 19 is secured, in a suitable manner, to the upper edge 20 of the low front wall 10, in a horizontal longitudinal position, and projects rearwardly beyond the rear face of the low front wall 10. The bar 19 is provided at intervals, spaced like the slots or notches 18 and aligned therewith across the container 6, with vertical cord or rubber band accommodating holes 22, the holes having rounded upper ends 23, precluding fraying of cords or rubber bands and providing for smooth movement thereof through the holes 22.

Below the bar 19 and in line with each hole 22 is suitable fastening means, such as hooks 24, engaged in and projecting from the rear side of the low front wall. A rubber band 25 has a lower end portion 26 engaged under each hook 24 and an upper end portion 27 extending upwardly through the related hole 22 and engaged through an eye 28 on the forward end of a preferably wire catch 29 having a straight shank 30 terminating at its rear end in an angular down-turned finger 31.

With the above described arrangement, a lure, generally designated 32, can be securably retained with respect to each aligned set of slots 18 and holes 22 by engaging the shank 33 on the rear end of the lure body 34 through a slot 18 with the points 35 of its gang hook 36 engaged in the rear face 37 of the bar 16; and then, while holding the lure body 34 forwardly and horizontally stretching the rubber band 25 upwardly and rearwardly and engaging the catch finger 31 downwardly through the line-attaching eye 38 on the forward end of the lure body 34, and releasing the catch 29. The natural contraction and tension of the rubber band 25 then acts to suspend the lure resiliently between the bars 16 and 19, out of contact with adjacent lures similarly suspended, and out of contact with the interior of the container 6.

In order to remove a lure, the operator should grasp the rear gang hook 36 between the fingers and pull back enough to disengage hook points 35 from back of bar 16, and then lift the shank 33 out of related slot 18. While still grasping hook 36 allow the tension to pull the lure 32 forward until the catch 29 engages hole 22, at which time the catch 29 will stand upright and automatically release itself from the lure eye 38. This leaves the operator holding the completely detached lure by the rear gang hook 36, and the whole operation has required the use of only one hand. There is no danger in this operation because at all times the fingers grasping the hook 36 are behind the hook points 35.

Referring now to Figure 3, the device therein shown has a container 6a similar to the container 6, except that the back and front walls 9a and 10a, respectively, have extensions 39 and 40, respectively, which depend below the bottom wall 7a, and the tensioned lure-retaining means differs from that shown in Figures 1 and 2.

Instead of the rubber band 25 of Figures 1 and 2, the retaining means of Figure 3 has a cord 25a passing through each hole 22a in the bar 19a and passing downwardly through a vertically aligned hole 41 in the container bottom wall 7a, around a pulley 42, secured as indicated at 43, to the underside of the bottom wall 7a. The lower end portion 26a of each cord 25a is connected to the forward end 45 of a helical contractile spring 46 whose rear end is connected, as indicated at 47 to the extension 39 of the back wall 9a. The upper end portion 27a of the cord 25a is secured to the catch 29a in the same manner as in Figures 1 and 2.

The use and operation of the form of Figure 3 is the same as in the case of the form of Figures 1 and 2.

What is claimed is:

1. A fishing lure holder comprising a container having a bottom wall, side walls, a back wall, and a front wall, the side walls and the back wall having coplanar upper edges and said front wall having an upper edge spaced below said coplanar edges, a cover hinged on said back wall at the upper edge thereof adapted to be closed to engage said coplanar edges, a first bar secured in the container and extending thereacross attached to the top of the front wall and being perpendicular thereto, said first bar having an upper edge spaced below said coplanar edges, the upper edge of said first bar having spaced vertical slots therein, a second bar extending across the interior of the container and secured to said front wall along the upper edge of the front wall, said second bar extending rearwardly into the container from said front wall, said first and second bars and said front wall being sufficiently spaced below the cover when closed to provide a lure-drying space thereat below the cover, said second bar having vertical holes therethrough which are aligned with the slots in said first bar, flexible and resilient members having intermediate portions trained through the holes of the second bar, said members having first end portions having lure-engaging catches thereon and second end portions, and means securing the second end portions of said members to the container at points below the second bar with the portions of said intermediate portions of the flexible members below said second bar in vertical alignment with the second bar holes.

2. A fishing lure holder according to claim 1, wherein said bottom wall has through openings vertically aligned with the second bar holes, pulleys secured to and located below the bottom wall in line with and rearwardly of said openings, said second bar holes and said bottom wall openings having their axes on a straight line that is tangential to the pulleys, the intermediate portions of the flexible and resilient members being trained through the bottom wall openings and beneath said pulleys, said securing means being connected to the bottom wall.

3. A fishing lure holder according to claim 1, wherein said bottom wall has through openings vertically aligned with the second bar holes, pulleys secured to and located below the bottom wall in line with and rearwardly of said openings, said second bar holes and said bottom wall openings having their axes on a straight line that is tangential to the pulleys, the intermediate portions of the flexible and resilient members being trained through the bottom wall openings and beneath said pulleys, said securing means being connected to the bottom wall, said intermediate portions of the flexible and resilient members being non-stretchable cords, and the first end portions being contractile springs.

4. A fishing lure holder according to claim 3, wherein said flexible and resilient members are elastic bands.

5. A fishing lure holder according to claim 3, wherein said flexible and resilient members are elastic bands and said securing means is secured to said front wall.

References Cited in the file of this patent

UNITED STATES PATENTS

| | | |
|---|---|---|
| 197,935 | Holt | Dec. 11, 1877 |
| 294,888 | Levison | Mar. 11, 1884 |
| 549,970 | Lawrence | Nov. 19, 1895 |
| 1,339,231 | Stewart | May 4, 1920 |
| 1,850,039 | Townsend | Mar. 15, 1932 |
| 1,897,672 | Neumann | Feb. 14, 1933 |
| 2,574,908 | Buicke | Nov. 13, 1951 |
| 2,608,459 | Malmquist | Aug. 26, 1952 |
| 2,629,964 | Thunell | Mar. 3, 1953 |
| 2,665,517 | Archer | Jan. 12, 1954 |

FOREIGN PATENTS

| | | |
|---|---|---|
| 113,922 | Great Britain | Mar. 14, 1918 |
| 471,462 | Canada | Feb. 13, 1951 |
| 698,318 | Great Britain | Oct. 14, 1953 |